US012753020B2

(12) United States Patent
Obata et al.

(10) Patent No.: US 12,753,020 B2
(45) Date of Patent: Oct. 6, 2026

(54) OBJECT ORIENTATION ADJUSTING DEVICE

(71) Applicants: NGK INSULATORS, LTD., Nagoya (JP); NGK KILNTECH, CORPORATION, Nagoya (JP); TAKAHAMA INDUSTRY CO., LTD., Takahama (JP)

(72) Inventors: Masato Obata, Nagoya (JP); Minoru Yamaguchi, Nagoya (JP); Tomoaki Oyama, Nagoya (JP); Takanori Isono, Nagoya (JP); Yoshimitsu Asano, Nagoya (JP); Masaaki Hasegawa, Takahama (JP); Jyunpei Tanino, Takahama (JP)

(73) Assignees: NGK INSULATORS, LTD., Nagoya (JP); NGK KILNTECH, CORPORATION, Nagoya (JP); TAKAHAMA INDUSTRY CO., LTD., Takahama (JP)

( * ) Notice: Subject to any disclaimer, the term of this patent is extended or adjusted under 35 U.S.C. 154(b) by 213 days.

(21) Appl. No.: 18/635,135

(22) Filed: Apr. 15, 2024

(65) Prior Publication Data

US 2024/0351799 A1 Oct. 24, 2024

(30) Foreign Application Priority Data

Apr. 20, 2023 (JP) ................................ 2023-069098

(51) Int. Cl.

*B65G 47/244* (2006.01)
*B65G 13/06* (2006.01)
*B65G 13/12* (2006.01)
*B65G 43/08* (2006.01)

(Continued)

(52) U.S. Cl.

CPC ......... *B65G 47/244* (2013.01); *B65G 13/065* (2013.01); *B65G 43/08* (2013.01); *F27B 9/2407* (2013.01); *B65G 2203/0225* (2013.01)

(58) Field of Classification Search

None

See application file for complete search history.

(56) References Cited

U.S. PATENT DOCUMENTS 9,365,361 B1 * 6/2016 Skarlupka .............. B65G 47/54
2017/0029219 A1 * 2/2017 Bindelli ................. B28D 7/046

FOREIGN PATENT DOCUMENTS

CN 113526096 A * 10/2021 ........... B65G 47/914
JP H04-184088 A 7/1992
WO WO-2023001702 A1 * 1/2023 ............. B65G 67/24

* cited by examiner

*Primary Examiner* — Gene O Crawford
*Assistant Examiner* — Muhammad Awais
(74) *Attorney, Agent, or Firm* — Muncy, Geissler, Olds & Lowe, P.C.

(57) ABSTRACT

An object orientation adjusting device 10 in a roller hearth kiln includes: a first roller group 18 including a plurality of rollers 17 configured to rotate in a direction perpendicular to a conveying direction; a second roller group 20 comprising a plurality of rollers 19 configured to rotate in the direction perpendicular to the conveying direction; a lifting apparatus configured to simultaneously lift the first roller group 18 and the second roller group 20; and first sensors A, A, second sensors B, B, third sensors C, C, fourth sensors D, D configured to detect an orientation of a saggar K on a plane and arranged on both sides of a conveying path in pairs.

6 Claims, 9 Drawing Sheets

(51) Int. Cl.

| | |
|---|---|
| ***B65G 47/24*** | (2006.01) |
| ***F27B 9/24*** | (2006.01) |

OBJECT ORIENTATION ADJUSTING DEVICE

REFERENCE TO RELATED APPLICATIONS

This application claims priority to Japanese Patent Application No. 2023-069098, filed on Apr. 20, 2023, the entire contents of which are hereby incorporated by reference into the present application.

TECHNICAL FIELD

The disclosure herewith relates to an object orientation adjusting device for a roller conveyor.

BACKGROUND ART

For example, in firing a cathode material for a lithium-ion secondary battery, a deposit may be formed on a surface of a conveying roller of a roller hearth kiln which is a roller-type conveyor. Due to the deposit on the surface of the conveying roller, an object to be conveyed thereon, which is a saggar housing a fired object, may not be conveyed properly in a furnace, and the object may be conveyed out of the furnace in an inappropriate orientation on a plane.

A conventional technology is known that includes a device which adjusts an orientation of an object (this device may also be referred to as an alignment device or a correction device). The device is a part of a roller hearth kiln which is a roller conveyor, and sensors to detect an orientation of the object on a plane are arranged in the device. When the sensors detect a displacement of the orientation of the object, the device presses press-in plates having three flat retractable rollers against the object from both sides of a conveying path along a direction perpendicular to a conveying direction by cylinder control using a pneumatic actuator in order to correct the orientation of the object (e.g., see Japanese Patent Application Publication No. H4-184088).

A conventional object orientation adjusting device can move an object back to its correct position on a conveying path and align it by adjusting the orientation of the object. Therefore, it was expected to prevent the object from hitting a side wall of the conveying path due to its orientation and thereby stopping moving and thereby prevent accidents such as conveyance being stopped or congestion of objects being conveyed.

However, with the conventional object orientation adjusting device, depending on an orientation angle of the object on the plane, the orientation of the object was not corrected as expected because corners of the object remained pressed from both sides by the press-in plates. In addition, when a force to press the object is increased in order to correct the orientation angle, this could damage the object (e.g., a ceramic saggar).

SUMMARY

In order to solve the above problem, the disclosure herein provides an object orientation adjusting device for a roller conveyor configured to adjust an orientation of an object without damaging the object regardless of an orientation angle of the object.

In a first embodiment of the technology disclosed herein, an object orientation adjusting device for a roller conveyor may be configured to convey the object. The object orientation adjusting device may comprise: a first roller group comprising a plurality of rollers configured to rotate in a direction perpendicular to a conveying direction; a second roller group comprising a plurality of rollers configured to rotate in the direction perpendicular to the conveying direction; a lifting apparatus configured to simultaneously lift the first roller group and the second roller group; and a sensor configured to detect an orientation of the object on a plane.

In a second embodiment of the technology disclosed herein, an object orientation adjusting device for a roller conveyor may be configured to convey the object. The object orientation adjusting device may comprise: a first roller chain part comprising a plurality of sprockets configured to rotate in a direction perpendicular to a conveying direction; and a roller chain; a second roller chain part comprising a plurality of sprockets configured to rotate in the direction perpendicular to the conveying direction; and a roller chain; a lifting apparatus configured to simultaneously lift the first roller chain part and the second roller chain part; and a sensor configured to detect an orientation of the object on a plane.

In a third embodiment of the technology disclosed herein, an object orientation adjusting device for a roller conveyor may be configured to convey the object. The object orientation adjusting device may comprise: a first belt part comprising a plurality of pulleys configured to rotate in a direction perpendicular to a conveying direction; and a belt; a second belt part comprising a plurality of pulleys configured to rotate in the direction perpendicular to the conveying direction; and a belt; a lifting apparatus configured to simultaneously lift the first belt part and the second belt part; and a sensor configured to detect an orientation of the object on a plane.

In a fourth embodiment of the technology disclosed herein according to any one of the first to third embodiments, the object orientation adjusting device may further comprise a stopper orientated in the direction perpendicular to the conveying direction and disposed on one side of a conveying path.

In the first embodiment of the technology disclosed herein, the object orientation adjusting device is configured to: convey the object onto the first roller group and the second roller group, then lift the first roller group and the second roller group; rotate the object in one direction on the plane by rotating the first roller group and the second roller group in directions opposite to each other until the sensor no longer detects the displacement of the orientation of the object on the plane to adjust an orientation of the object on the plane; then lower the first roller group and the second roller group; and convey the object.

In the first embodiment of the technology disclosed herein, the object orientation adjusting device is configured to: convey the object onto the first roller group and the second roller group; then lift the first roller group and the second roller group; rotate the object in one direction on the plane by rotating the first roller group and the second roller group in the same direction at certain different speeds (e.g., the second roller group is rotated at a speed faster than the first roller group) until the sensor no longer detects the displacement of the orientation of the object on the plane to adjust the orientation of the object on the plane; then lower the first roller group and the second roller group; and convey the object.

Therefore, regardless of the orientation angle of the object on the plane, the orientation of the object can be adjusted. Therefore, it is possible to prevent the object from hitting a side wall of the conveying path due to its orientation and stopping moving, and thereby accidents such as conveyance being stopped or congestion of objects on the conveying path can be prevented.

In the second embodiment of the technology disclosed herein, the object orientation adjusting device is configured to: convey the object onto the first roller chain part and the second roller chain part; lift the first roller chain part and the second roller chain part; rotate the object in one direction on the plane by rotating the first roller chain part and the second roller chain part in directions opposite to each other until the sensor no longer detects the displacement of the orientation of the object on the plane to adjust the orientation of the object on the plane; then lower the first roller chain part and the second roller chain part; and convey the object.

In the second embodiment of the technology disclosed herein, the object orientation adjusting device is configured to: convey the object onto the first roller chain part and the second roller chain part; then lift the first roller chain part and the second roller chain part; rotate the object in one direction on the plane by rotating the first roller chain part and the second roller chain part in the same direction at certain different speeds (e.g., the second roller chain part is rotated at a speed faster than the first roller chain part) until the sensor no longer detects the orientation of the displacement of the object on the plane to adjust the orientation of the object on the plane; then lower the first roller chain part and the second roller chain part; and convey the object.

Therefore, regardless of the orientation angle of the object on the plane, the orientation of the object can be adjusted. Therefore, it is possible to prevent the object from hitting a side wall of the conveying path due to its orientation and stopping moving, and accidents such as conveyance being stopped or congestion of objects on the conveying path can be prevented.

In the third embodiment of the technology disclosed herein, the object orientation adjusting device is configured to: convey the object onto the belt part and the second belt part; lift the first belt part and the second belt part; rotate the object in one direction on the plane by rotating the first belt part and the second belt part in directions opposite to each other until the sensor no longer detects a displacement of the object on the plane to adjust the orientation of the object on the plane; then lower the first belt part and the second belt part; and convey the object.

In the third embodiment of the technology disclosed herein, the object orientation adjusting device is configured to: convey the object onto the first belt part and the second belt part; then lift the first belt part and the second belt part; rotate the object in one direction on the plane by rotating the first belt part and the second belt part in the same direction at certain different speeds (e.g., the second belt part is rotated at a speed faster than the first belt part) until the sensor no longer detects the displacement of the object on the plane to adjust the orientation of the object on the plane; then lower the first belt part and the second belt part; and convey the object.

Therefore, regardless of the orientation angle of the object on the plane, the orientation of the object can be adjusted. Therefore, it is possible to prevent the object from hitting a side wall of the conveying path due to its orientation and stopping moving, and accidents such as conveyance being stopped or congestion of objects on the conveying path can be prevented.

In the fourth embodiment of the technology disclosed herein according to any one of the first to third embodiments, the object orientation adjusting device is configured to adjust the orientation of the object on the plane, further press the object against the stopper, adjust the orientation again, and then convey the object.

Therefore, the orientation of the object can be methodically adjusted. Therefore, it is better able to prevent the object from hitting a side wall of the conveying path due to its orientation and stopping moving, and accidents such as conveyance being stopped or congestion of objects on the conveying path can be prevented.

DESCRIPTION

Figure 1:
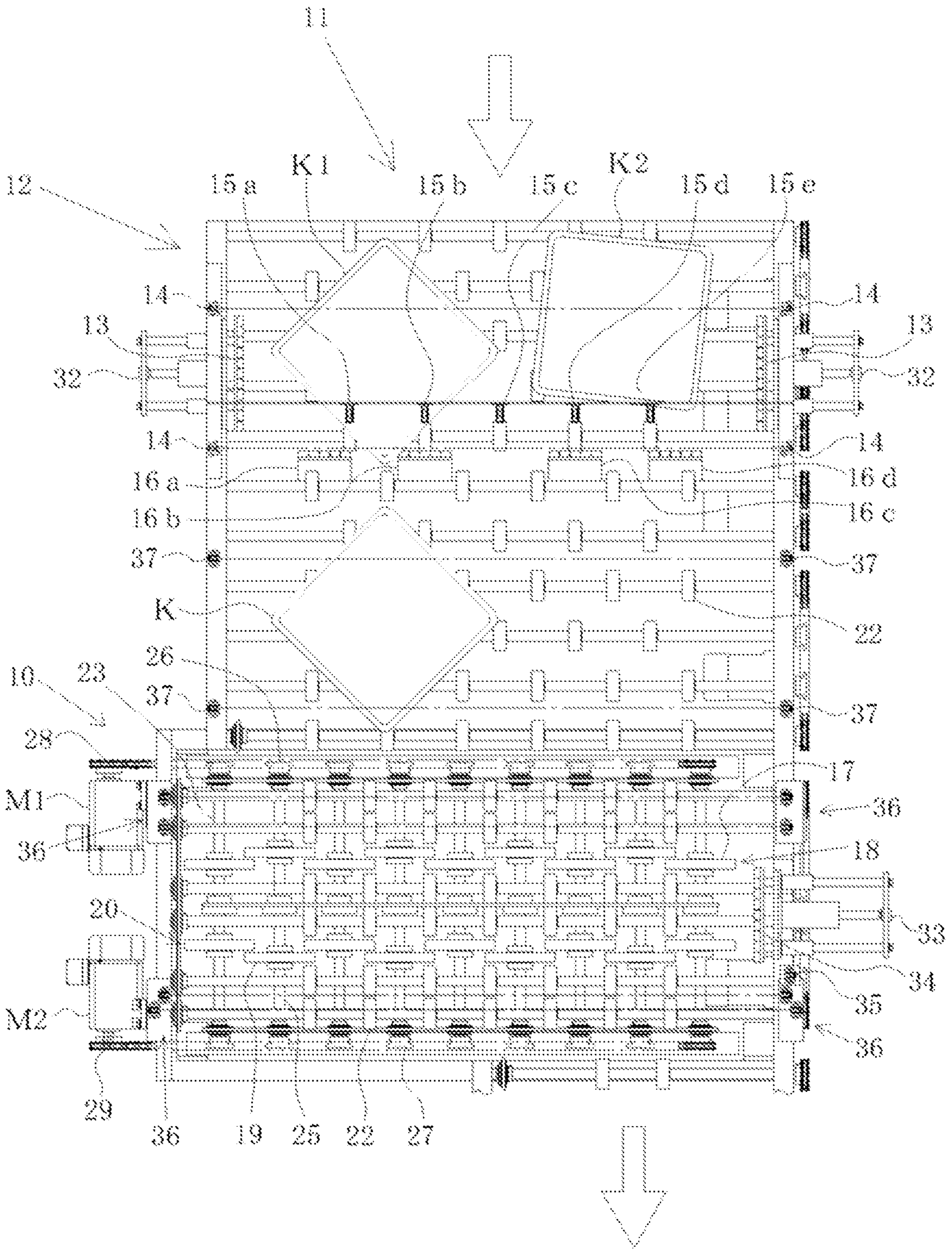
FIG. 1 shows a plan view of a separating device and an orientation adjusting device of the present disclosure (first embodiment).
Figure 2:
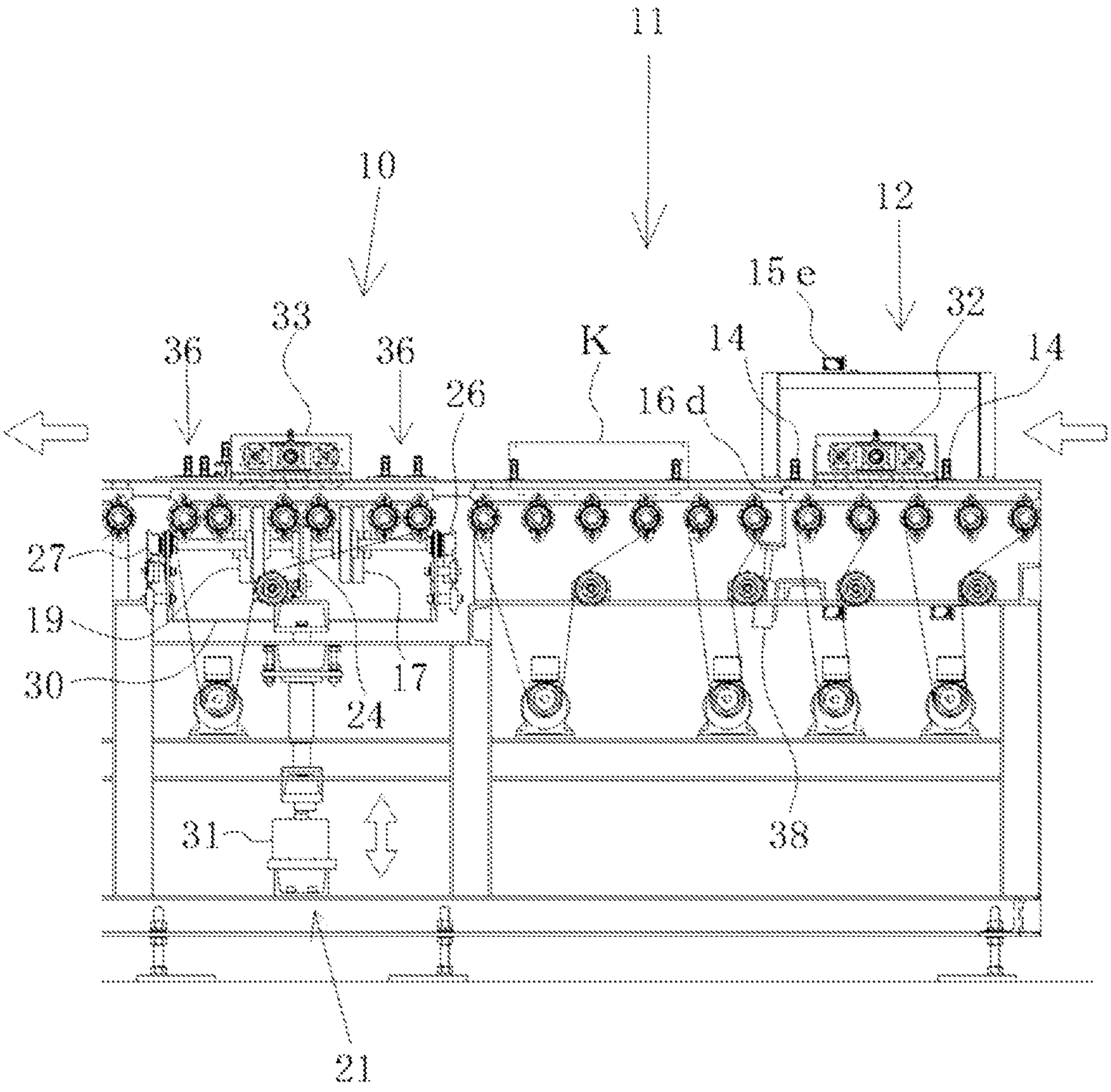
FIG. 2 shows the orientation adjusting device of the present disclosure (first embodiment).

A first embodiment of an object orientation adjusting device 10 for a roller conveyor of the present disclosure will be described (see FIGS. 1 and 2). Descriptions on accompanying program control, air piping(s), electrical wiring(s), etc. are omitted.

The orientation adjusting device 10 is disposed on a conveying path downstream of a furnace outlet, which is a part of a known roller hearth kiln 11 being a roller conveyor. The orientation adjusting device 10 is used to adjust orientations of objects on a plane. The objects are a plurality of square ceramic saggars K housing fired products. The orientation adjusting device 10 is configured to adjust the objects to their normal states. The objects to be handled by the orientation adjusting device 10 are not limited to rectangular ceramic saggars K.

A width of the conveying path of the roller hearth kiln 11 is set in advance to a width that allows a maximum of two saggars K to be placed side-by-side. The orientation adjusting device 10 is not limited to being a part of the roller hearth kiln 11. It can be a part of what is commonly referred to as a roller conveyor.

The orientation adjusting device 10 is installed to be used in processing that takes place downstream of the separating device 12, located on the conveying path of the roller hearth kiln 11. The separating device 12 is used to separate (deliver) the saggars K one by one toward the orientation adjusting device 10. The separating device 12 and the orientation adjusting device 10 are driven by known driving means constituted of combination of respective motor(s) with reduction gear(s), roller chain(s), sprocket(s), etc., by which the saggars K are conveyed.

The separating device 12 includes a pair of pressing plates 13, 13 on both sides of the conveying path and two pairs of photoelectric sensors 14, 14, 14, 14 disposed in vicinity of the pair of pressing plates 13, 13 on both sides of the conveying path. These plates 13, 13 can advance inward and retract by cylinder control in a direction perpendicular to a conveying direction by actuators 32 using a pair of air cylinders.

A plurality of attachments is disposed on the pair of pressing plates 13, 13. A material of the attachments can be anything, such as ceramics, resin, or metal. The pair of pressing plates 13, 13 is used to press and align the saggars K from both sides so that they do not stick out beyond the regular conveying path after the two pairs of photoelectric sensors 14, 14, 14, 14 detect the saggars K being conveyed.

Further, five photoelectric sensors 15*a*, 15*b*, 15*c*, 15*d*, 15*e*, four separating stoppers 16*a*, 16*b*, 16*c*, 16*d*, and two pairs of photoelectric sensors 37, 37, 37, 37 are disposed on the separating device 12 at predetermined intervals along a width direction of the conveying path.

The five photoelectric sensors 15*a*, 15*b*, 15*c*, 15*d*, and 15*e* are used to detect the conveyed saggars K. The two pairs of photoelectric sensors 37, 37, 37, 37 are used to detect the saggars K that have been conveyed to the orientation adjusting device 10.

Each of the four separating stoppers 16*a*, 16*b*, 16*c*, and 16*d* is constituted of a plate member with a plurality of attachments, and is disposed such that it can move upward beyond and downward below the conveying path by cylinder control by the actuator 38 using an air cylinder connected thereto. A material of the attachments can be anything, such as ceramics, resin, or metal.

The four separating stoppers 16*a*, 16*b*, 16*c*, and 16*d* are used to temporarily stop the conveyed saggars K by bringing themselves into contact with the saggars K in order to separate and convey them one by one toward the orientation adjusting device 10 in the subsequent process.

The four separating stoppers 16*a*, 16*b*, 16*c*, and 16*d* always protrude upward beyond the conveyor path so that the stoppers can stop the conveyed saggars K. For example, first, a saggar K1 inclined on a plane is conveyed and temporarily stopped by the separating stoppers 16*a*, 16*b*.

Immediately thereafter, a saggar K2 inclined on a plane is conveyed next to the saggar K1, and stopped temporarily by the separating stoppers 16*c*, 16*d*. The five photoelectric sensors 15*a*, 15*b*, 15*c*, 15*d*, 15*e* detect the saggars K1 and K2, and lower the separating stoppers 16*a* and 16*b* below the conveying path in order to separate and convey the saggar K1 that has conveyed first toward the orientation adjusting device 10 in the subsequent process.

When the saggar K1 is separated and conveyed toward the orientation adjusting device 10 and the five photoelectric sensors 15*a*, 15*b*, 15*c*, 15*d*, 15*e* no longer detect the saggar K1, the separating stoppers 16*a*, 16*b* protrude again upward beyond the conveying path to temporally stop the subsequently conveyed saggar K.

Since the saggars K are separated and conveyed one by one from the separating device 12 toward the orientation adjusting device 10, the separating stoppers 16*c*, 16*d* are lowered below the conveying path to separate and convey the saggar K2 toward the orientation adjusting device 10 after adjustment of an orientation of the saggar K1 on the plane is completed by the orientation adjusting device 10 and the saggar K1 is conveyed to a subsequent process.

The device for separating and conveying the saggars K one by one toward the orientation adjusting device 10 is not limited to the separating device 12. Any device that is configured to separate and convey the saggars K one by one toward the orientation adjusting device 10 can be employed.

The orientation adjusting device 10 of the present disclosure comprises: a first roller group 18 comprising a plurality of rollers 17 configured to rotate in a direction perpendicular to the conveying direction; a second roller group 20 comprising a plurality of rollers 19 configured to rotate in the direction perpendicular to the conveying direction; a lifting apparatus 21 configured to simultaneously lift the first roller group 18 and the second roller group 20; and the photoelectric sensor group 36 configured to detect the orientation of the saggar K on the plane.

The first roller group 18 and the second roller group 20 are provided in parallel, sandwiching two of a plurality of rows of conveyor group including a plurality of conveyor rollers 22. In the first roller group 18, each of the plurality of rollers 17 is attached to its corresponding shaft 23 which is along the conveying direction such that it can rotate in a direction perpendicular to the conveying direction.

One end of each shaft 23 has a sprocket 26 attached thereto and is supported on a frame 30 of the lifting apparatus 21 to be described later. The other end of each shaft 23 is supported on a partition member 24 of the lifting apparatus 21 to be described later.

The sprocket 26 at one end of each shaft 23 is connected, via a roller chain 28, to a motor M1 with a speed reducer arranged on one side of the lifting apparatus 21 to be described later. Therefore, by driving the motor M1, the shafts 23 can be rotated, which allows the plurality of rollers 17 of the first roller group 18 to rotate in the direction perpendicular to the conveying direction.

In the second roller group 20, each of the multiple rollers 19 is attached to its corresponding shaft 25 which is along the conveying direction such that it can rotate in the direction perpendicular to the conveying direction. One end of each shaft 25 has a sprocket 27 attached thereto and is supported on the frame 30 of the lifting apparatus 21 to be described later. The other end of each shaft 25 is supported on the partition member 24 of the lifting apparatus 21 to be described later.

The sprocket 27 at one end of each shaft 25 is connected, via a roller chain 29, to a motor M2 with a speed reducer disposed on one side of the lifting apparatus 21 to be described later. Therefore, by driving the motor M2, the shafts 25 can be rotated, which allows the multiple rollers 19 of the second roller group 20 to rotate in the direction perpendicular to the conveying direction.

Driving of the motor M1 and the motor M2 are controlled independently. Thus, the plurality of rollers 17 of the first roller group 18 and the plurality of rollers 19 of the second roller group 20 can rotate forward and reverse, individually or simultaneously, in the direction perpendicular to the conveying direction.

Therefore, by placing the saggar K on the first roller group 18 and the second roller group 20 and driving the motors M1 and M2 to rotate the first roller group 18 and the second roller group 20 in directions opposite to each other, the saggar K can be rotated in one direction on the plane.

The saggar K can also be rotated in one direction on the plane by placing the saggar K on the first roller group 18 and the second roller group 20 and driving the motors M1 and M2 to rotate the first roller group 18 and the second roller group 20 in the same direction at certain different speeds.

The lifting apparatus 21 comprises the frame 30 installed under the conveying path and an actuator 31 using an air cylinder connected to the frame 30 as its main components. The frame 30 supports the shafts 23 of the first roller group 18 and the shafts 25 of the second roller group 20 on its both ends, also supports them at the center using the partition member 24, and further supports one side of the motor M1 connected thereto via the sprockets 26 and the roller chain 28 disposed at one ends of the shafts 23 and one side of the Motor M2 connected thereto via the sprockets 27 and the roller chain 29 disposed at one ends of shaft 25.

The lifting apparatus 21 is disposed such that it can lift the frame 30 by cylinder control with the actuator 31 using an air cylinder. The lifting apparatus 21 is disposed such that it can lift the first roller group 18 and the second roller group 20 simultaneously to a position higher than the height of the conveying rollers 22 and lower to a position lower than the height of the conveying rollers 22.

Therefore, the driving of the conveying rollers 22 and the driving of the first roller group 18 and the second roller group 20 do not interfere with each other. The lifting apparatus 21 does not necessarily have to include an air cylinder, and it may be realized by, for example, a method realized by combining a rotation mechanism of a motor with a reduction gear and a cam or other means.

Therefore, the saggar K can be rotated on the plane by: conveying the saggar K inclined on the plane onto the first roller group 18 and the second roller group 20 and stopping them; operating the lifting apparatus 21; lifting the first roller group 18 and the second roller group 20 with the saggar K placed on them; driving the motors M1 and M2; and rotating the first roller group 18 and the second roller group 20 in directions opposite to each other.

Since there is a gap between the plurality of rows of conveying rollers 22, the first roller group 18 and the second roller group 20 can be lifted from between the plurality of rows of conveying rollers 22 with no trouble.

The photoelectric sensor group 36 for detecting the orientation of the saggar K on the plane comprises four sensors arranged on both sides of the conveying path in pairs: a first sensor A, A; a second sensor B, B; a third sensor C, C; a fourth sensor D, D (see FIGS. 3-5).

The photoelectric sensor group 36 is arranged in advance to enable smooth adjustment of the orientation of the saggar K on the plane. The number, role, arrangement, and the like, of the photoelectric sensor group 36 vary depending on the shape and size of the saggar K which is an object to be conveyed and an acceptable reference range for orientation adjustment, and the like, and many types of variations can be contemplated. These sensors for detecting the orientation of the saggar K on the plane are not limited to photoelectric sensors.

The first sensors A, A are used to detect that the saggar K is in an abnormal position. The second sensors B, B are used to detect that the orientation of the saggar K on the plane has been adjusted. The third sensors C, C are used to detect that the saggar K is in its normal position. The third sensors C, C are also used to detect that the saggar K is in a position at which conveyance of the saggar K should be stopped.

When the third sensors C, C detect the saggar K, the center of gravity of the saggar K is positioned substantially between the first roller group 18 and the second roller group 20 in most cases, although it depends on its degree of orientation on the plane, and the adjustment of the orientation of the saggar K is smoothly performed on the plane.

The fourth sensors D, D are used to further convey the saggar K and detect the saggar K again when the saggar K is conveyed until it is detected by the third sensors C, C, and at the same time the first sensors A, A also detect the saggar K. When the fourth sensors D, D detect the saggar K, the conveyance stops.

When the saggar K is conveyed until it is detected by the third sensors C, C and at the same time the first sensors A, A also detect the saggar K, the center of gravity of the saggar K is not positioned between the first roller group 18 and the second roller group 20.

Thus, the saggar K is further advanced until the fourth sensors D, D detect the saggar K and stopped, so that the center of gravity of the saggar K is positioned substantially between the first roller group 18 and the second roller group 20. When the center of gravity of the saggar K is positioned substantially between the first roller group 18 and the second roller group 20, adjustment of the orientation of the saggar K on the plane can smoothly be performed.

The orientation adjusting device 10 further comprises a stopper 34 on one side of the conveying path which can advance inward and retract in the direction perpendicular to the conveying direction by cylinder control by the actuator 33 using an air cylinder.

The stopper 34 includes a plurality of attachments. A material of the attachments can be anything, such as ceramics, resin, or metal. A photoelectric sensor 35 for detecting the saggar K is arranged next to the stopper 34. The stopper 34 may not use cylinder control by the actuator 33 using an air cylinder, and may simply be fixed with the stopper 34 oriented in the direction perpendicular to the conveying direction.

The stopper 34 is used to methodically re-adjust the orientation of the saggar K on the plane by pressing itself against the saggar K. By rotating the first roller group 18 and the second roller group 20 in the same direction, the saggar K whose orientation on the plane has been adjusted is conveyed to just upstream of the stopper 34. After the photoelectric sensor 35 detects the saggar K, the stopper 34 operates and presses the stopper 34 against the saggar K.

The saggar K whose orientation on the plane has been methodically re-adjusted again by the stopper 34 is conveyed to the subsequent process. The orientation adjusting device 10 may adjust the orientation of the saggar K on the plane without the stopper 34.

The operation of the object orientation adjusting device 10 for a roller conveyor of the first embodiment of the present disclosure will be described (see FIGS. 1-6). The operation of the orientation adjusting device 10 based on the operation of the photoelectric sensor group 36 is automatically controlled by a program.

Figure 3A:
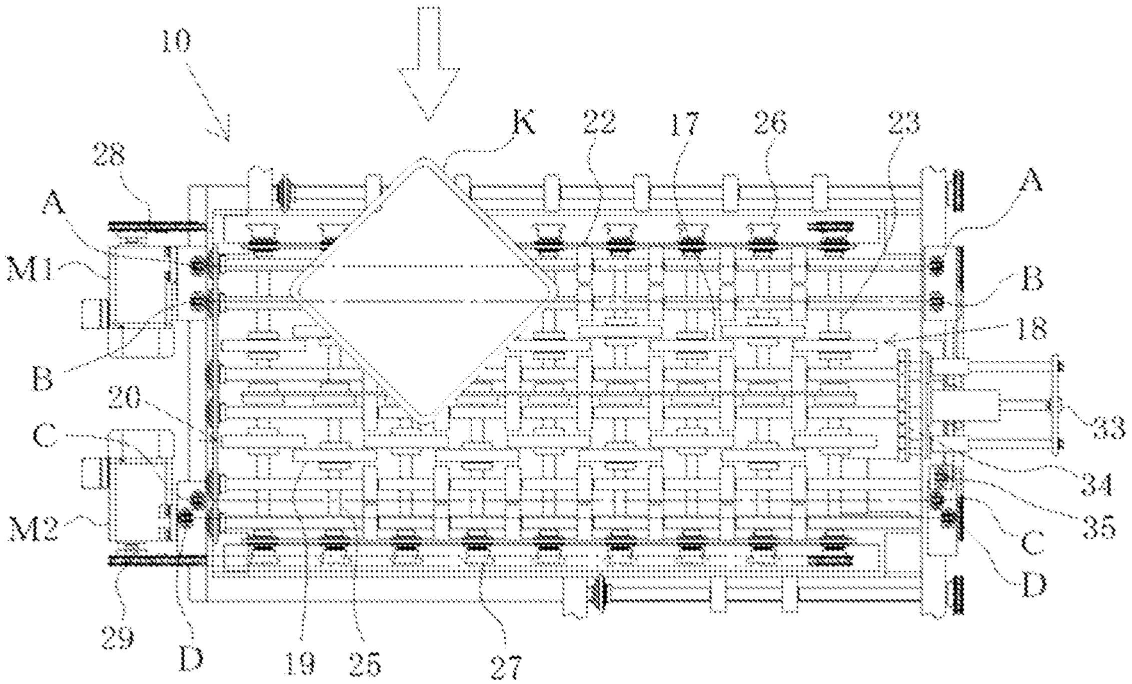
FIG. 3A is a plan view showing an operation of the orientation adjusting device of the present disclosure (first embodiment).

One saggar K inclined on the plane is conveyed from the separating device 12 to the orientation adjusting device 10 (see FIG. 3A). The rotation of the conveying rollers 22 of the orientation adjusting device 10 conveys the saggar K forward.

Figure 3B:
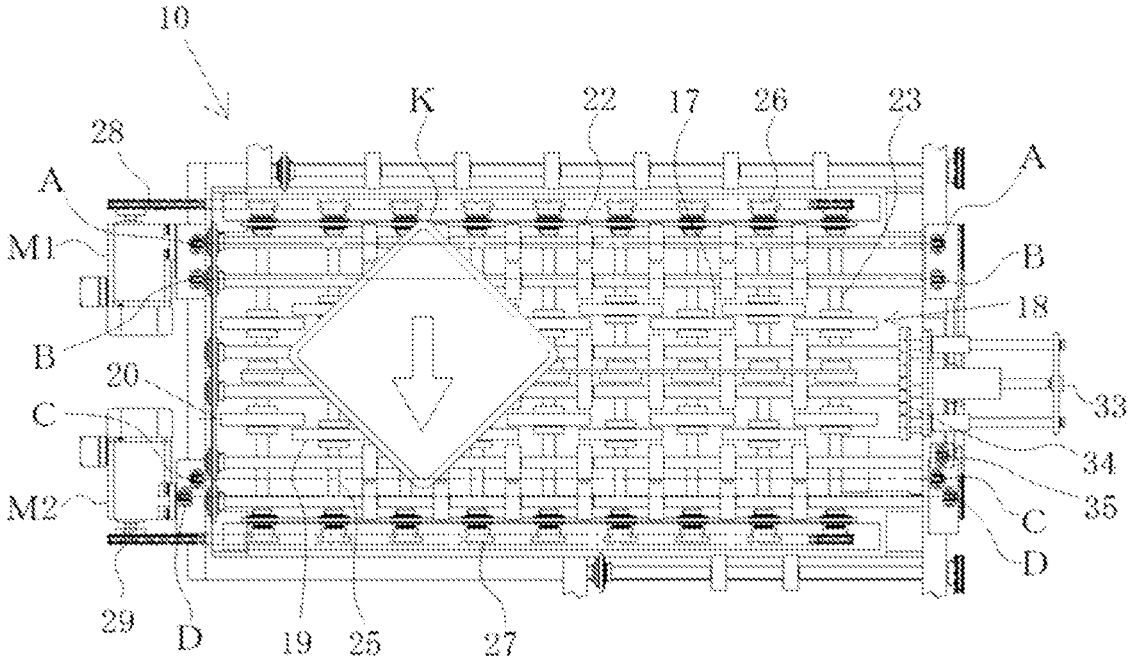
FIG. 3B is a plan view showing an operation of the orientation adjusting device of the present disclosure (first embodiment).

The saggar K which is being conveyed is detected by the third sensors C, C (see FIG. 3B). At this time, the saggar K is also detected by the first sensors A, A and the second sensors B, B.

Since the first sensors A, A are also detecting the saggar K, the conveyance of the saggar K proceeds until the saggar K is detected by the fourth sensors D, D. This is to position the center of gravity of the saggar K substantially between the first roller group 18 and the second roller group 20.

As the saggar K is conveyed until it is detected by the third sensors C, C and at the same time the saggar K is not detected by the first sensors A, A, the conveyance stops because the center of gravity of the saggar K is located substantially between the first roller group 18 and the second roller group 20.

Figure 4A:
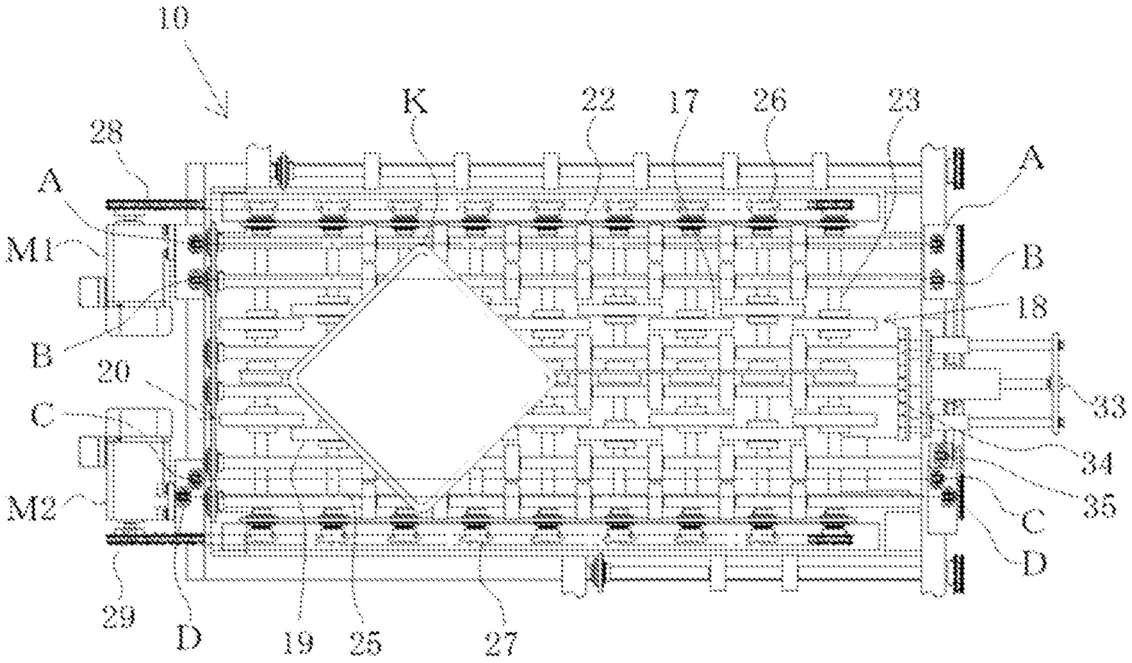
FIG. 4A is a plan view showing an operation of the orientation adjusting device of the present disclosure (first embodiment).
Figure 4B:
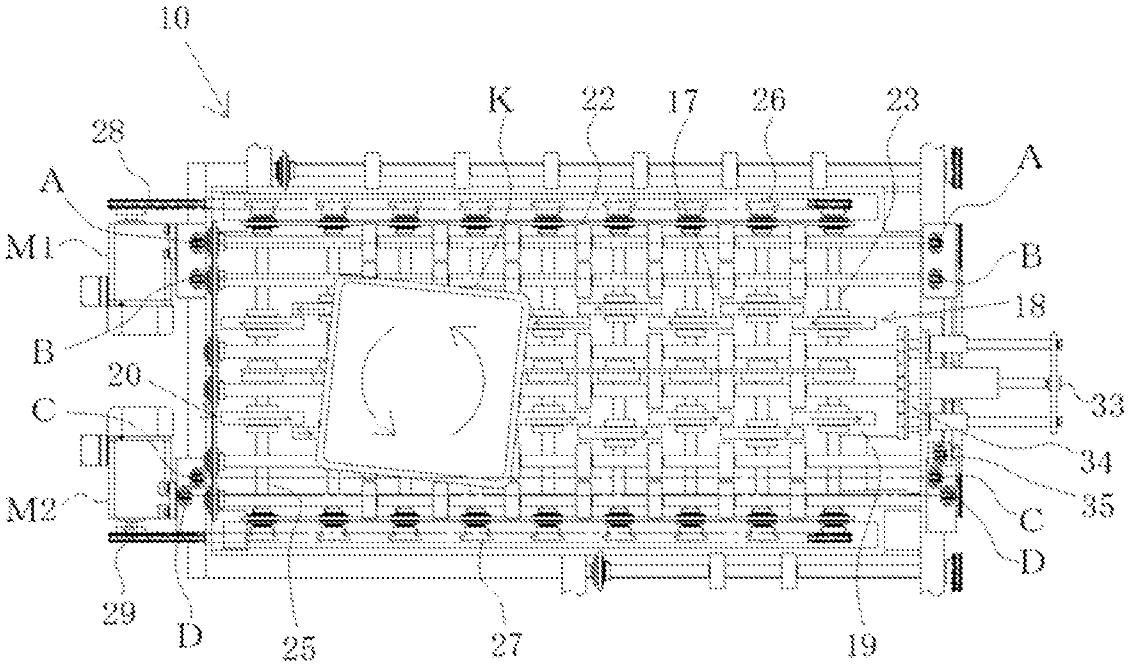
FIG. 4B is a plan view showing an operation of the orientation adjusting device of the present disclosure (first embodiment).
Figure 5A:
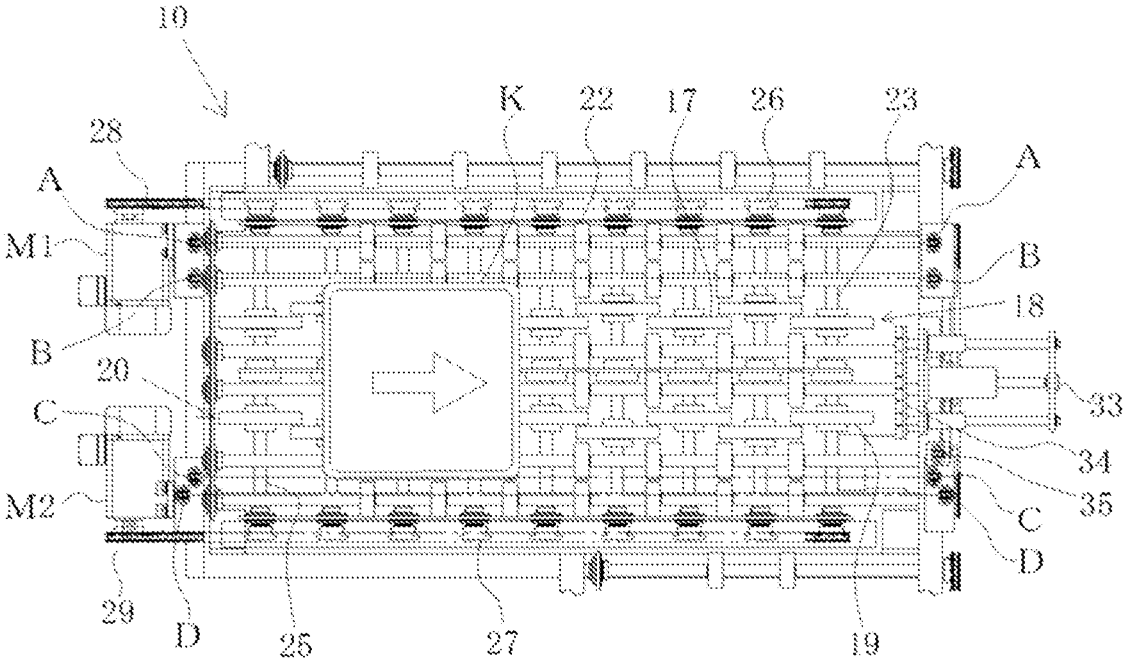
FIG. 5A is a plan view showing an operation of the orientation adjusting device of the present disclosure (first embodiment).
Figure 5B:
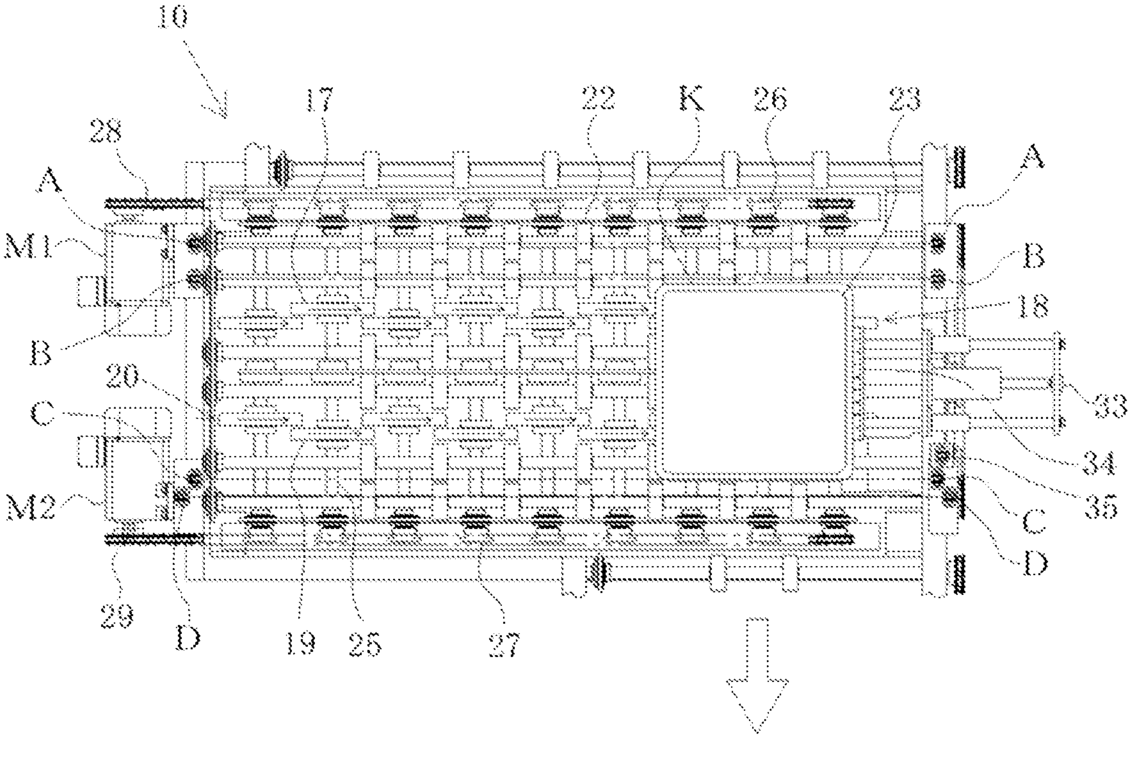
FIG. 5B is a plan view showing an operation of the orientation adjusting device of the present disclosure (first embodiment).
Figure 6:
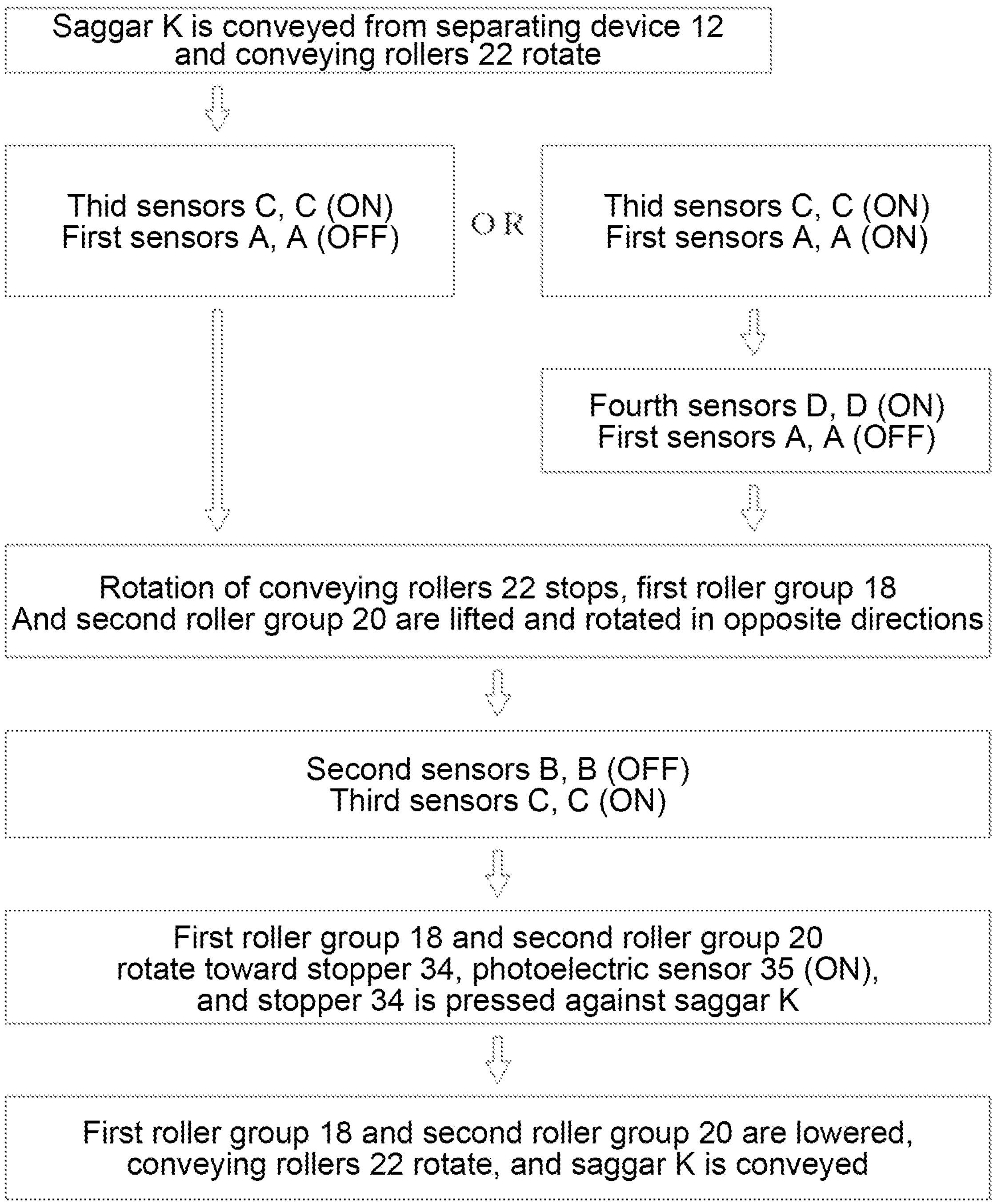
FIG. 6 is a flowchart showing an operation of the orientation adjusting device of the present disclosure (first embodiment).

After the saggar K which is being conveyed is detected by the fourth sensor D, D, the conveyance stops (see FIG. 4A). At this time, the saggar K is also detected by the second sensors B, B and the third sensors C, C. Further, at this time, the center of gravity of the saggar K is positioned substantially between the first roller group 18 and the second roller group 20.

When the conveyance of the saggar K stops, the lifting apparatus 21 operates and the first roller group 18 and the second roller group 20 are lifted with the saggar K placed on them. Then, the motor M1 and the motor M2 are driven to rotate the first roller group 18 and the second roller group 20 in directions opposite to each other (see FIG. 4B). Then, the saggar K on the first roller group 18 and the second roller group 20 rotates in one direction on the plane.

The saggar K is rotated in one direction on the plane until the second sensors B, B no longer detect the saggar K while the third sensors C, C detect the saggar K. When the saggar K is no longer detected by the second sensors B, B, this means the orientation of the saggar K on the plane has been adjusted. Then, the drive of the motors M1 and M2 stops, and the rotation of the first roller group 18 and the second roller group 20 stops (see FIG. 5A).

Then, in order to convey the saggar K toward the stopper 34, the motor M1 and the motor M2 are driven again to rotate the first roller group 18 and the second roller group 20 in the same direction. When the photoelectric sensor 35 arranged next to the stopper 34 detects the saggar K conveyed by the first roller group 18 and the second roller group 20, the actuator 33 using an air cylinder operates to press the stopper 34 against the saggar K (see FIG. 5B).

When the drive of the motors M1 and M2 stops and the rotation of the first roller group 18 and the second roller group 20 stops, the lifting apparatus 21 operates and the first roller group 18 and the second roller group 20 lowers with the saggar K placed on them.

The saggar K pressed by the stopper 34 is conveyed to the subsequent process by the rotation of the conveying rollers 22 after its orientation on the plane is methodically re-adjusted. Then, another saggar K that is displaced on the plane is conveyed from the separating device 12 to the orientation adjusting device 10 by the rotation of the conveying rollers 22, and the above operation is repeated.

Figure 7:
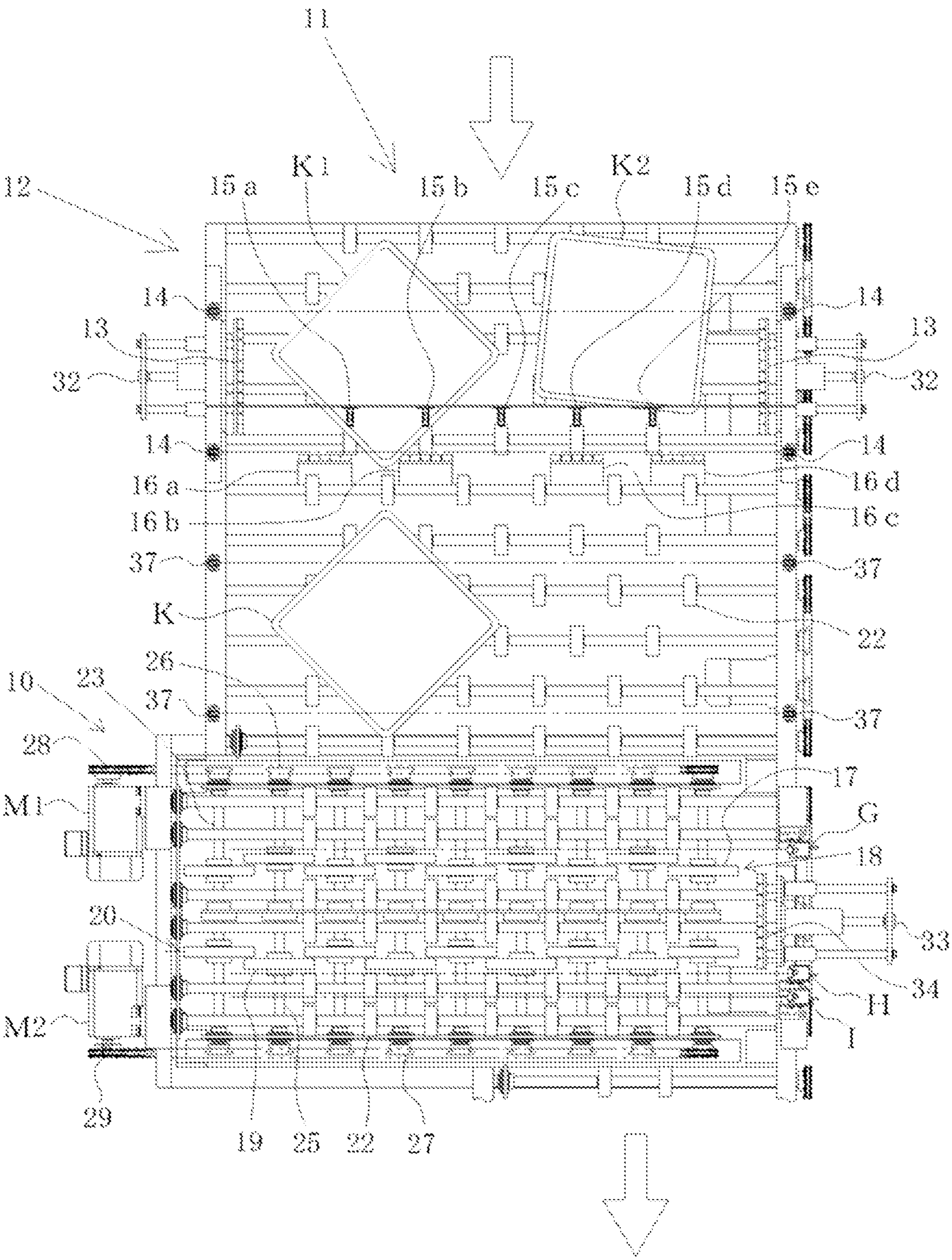
FIG. 7 is a plan view of the separating device and the orientation adjusting device of the present disclosure (first embodiment) with different sensors.

The sensors for detecting the orientation of the saggar K on the plane may be laser distance sensors instead of the photoelectric sensor group 36. For example, instead of the photoelectric sensor group 36, three sensors including a first laser distance sensor G, a second laser distance sensor H, and a third laser distance sensor I may be installed at positions where the sensors can hit laser to the saggar K when the center of gravity of the saggar K is positioned substantially between the first roller group 18 and the second roller group 20 (see FIG. 7).

Distances at which the orientation of the saggar K on the plane can be determined to have been adjusted are preset in the first laser distance sensor G, the second laser distance sensor H, and the third laser distance sensor I.

Three laser distance sensors are provided instead of two sensors for the following reasons. When only two laser distance sensors are provided, they would erroneously determine that the orientation has been adjusted despite the saggar K being inclined in the case where the orientation of the saggar K on the plane is in a diamond-shaped orientation for which both of the two laser distance sensors may recognize the same distance.

The operation of the orientation adjusting device 10 when the first laser distance sensor G, the second laser distance sensor H, and the third laser distance sensor I are provided instead of the photoelectric sensor group 36 is as follows. One saggar K displaced on the plane is conveyed from the separating device 12 to the orientation adjusting device 10, and when the first laser distance sensor G, the second laser distance sensor H, and the third laser distance sensor I detect the saggar K, the rotation of the conveying rollers 22 stops and the conveyance stops.

When the conveyance of the saggars K stops, the lifting apparatus 21 operates and the first roller group 18 and the second roller group 20 are lifted with the saggar K placed on them. Then, the motor M1 and the motor M2 are driven to rotate the first roller group 18 and the second roller group 20 in directions opposite to each other. Then, the saggar K on the first roller group 18 and the second roller group 20 rotates in one direction on the plane.

The saggar K is rotated in one direction on the plane until the first laser distance sensor G, the second laser distance sensor H, and the third laser distance sensor I recognize distances at which it can be determined that the orientation of the saggar K on the plane has been adjusted. When the first laser distance sensor G, the second laser distance sensor H, and the third laser distance sensor I recognize the distance at which it can be determined that the orientation of the saggar K on the plane has been adjusted, this means that the orientation of the saggar K on the plane has been adjusted. Then, the drive of the motors M1 and M2 stops, and the rotation of the first roller group 18 and the second roller group 20 stops.

Then, in order to convey the saggar K toward the stopper 34, the motor M1 and the motor M2 are driven again to rotate the first roller group 18 and the second roller group 20 in the same direction. When the first laser distance sensor G, the second laser distance sensor H, and the third laser distance sensor K recognize the preset distance from the saggar K, the actuator using the air cylinder operates and the stopper 34 is pressed against the saggar K.

When the drive of the motors M1 and M2 stops and the rotation of the first roller group 18 and the second roller group 20 stops, the lifting apparatus 21 is activated to lower the first roller group 18 and the second roller group 20 with the saggar K placed on them. The saggar K pressed by the stopper 34 is conveyed to the subsequent process by the rotation of the conveying rollers 22 after its orientation on the plane is methodically re-adjusted.

Figure 8:
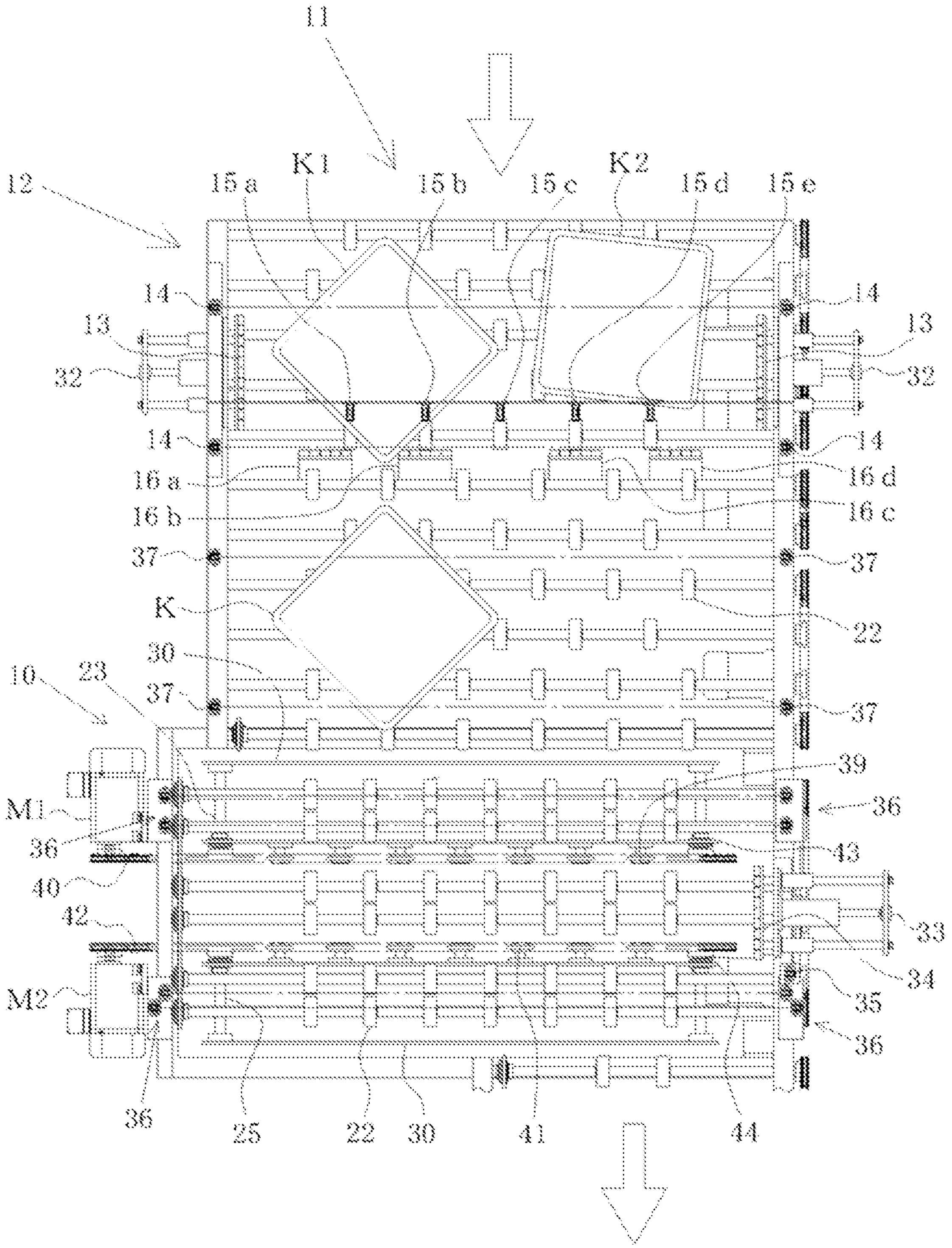
FIG. 8 shows a plan view of a separating device and an orientation adjusting device of the present disclosure (second embodiment).

The second embodiment of the object orientation adjusting device 10 for a roller conveyor of the present disclosure will be described (see FIG. 8). The same reference signs are used to describe the configurations common to the first embodiment of the orientation adjusting device 10.

The orientation adjusting device 10 of the second embodiment comprises: the first roller chain part 40 comprising a plurality of sprockets 39 configured to rotate in the direction perpendicular to the conveying direction and a roller chain; a second roller chain part 42 comprising a plurality of sprockets 41 configured to rotate in the direction perpendicular to the conveying direction and a roller chain; a lifting apparatus 21 configured to simultaneously lift the first roller chain part 40 and the second roller chain part 42; and the photoelectric sensor group 36 configured to detect an orientation of the saggar K on the plane as its main components. Roller chains of the first roller chain part 40 and the second roller chain part 42 are known roller chains and can be of any type.

The orientation adjusting device 10 of the second embodiment is obtained by replacing the first roller group 18 and the second roller group 20 of the orientation adjusting device 10 of the first embodiment with the first roller chain part 40 and the second roller chain part 42. The first roller chain part 40 and the second roller chain part 42 are provided in parallel, sandwiching two of the plurality of rows of conveying roller group including the plurality of conveying rollers 22.

The first roller chain part 40 comprises a plurality of sprockets 39 supported by a plate 43 connected via the shafts 23 supported by one end of the frame 30 of the lifting apparatus 21, and a roller chain.

The plurality of sprockets 39 is connected, via the roller chain, to the motor M1 with a speed reducer disposed on one side of the lifting apparatus 21. Therefore, by driving the motor M1, the plurality of sprockets 39 can be rotated, allowing the first roller chain part 40 to rotate in the direction perpendicular to the conveying direction.

The second roller chain part 42 comprises a plurality of sprockets 41 supported by a plate 44 connected via the shafts 25 supported by the other one end of the frame 30 of the lifting apparatus 21, and a roller chain.

The plurality of sprockets 41 is connected, via the roller chain, to the motor M2 with a speed reducer disposed on one side of the lifting apparatus 21. Therefore, by driving the motor M2, the plurality of sprockets 39 can be rotated, allowing the second roller chain part 42 to rotate in the direction perpendicular to the conveying direction.

Driving of the motor M1 and the motor M2 are controlled independently. Thus, the first roller chain part 40 and the second roller chain part 42 can rotate forward and reverse, individually or simultaneously, in the direction perpendicular to the conveying direction.

Therefore, by placing the saggar K on the first roller chain part 40 and the second roller chain part 42 and driving the motors M1 and M2 to rotate the first roller chain part 40 and the second roller chain part 42 in directions opposite to each other, the saggars K can be rotated in one direction on the plane.

The saggar K can also be rotated in one direction on the plane by placing the saggar K on the first roller chain part 40 and the second roller chain part 42 and driving the motors M1 and M2 to rotate the first roller chain part 40 and the second roller chain part 42 in the same direction at certain different speeds.

The other configurations, such as the lifting apparatus 21 configured to lift the first roller chain part 40 and the second roller chain part 42 simultaneously, and the photoelectric sensor group 36 for detecting the orientation of the saggars K on the plane, are the same as in the first embodiment, and the explanations are therefore omitted. The operation of the orientation adjusting device 10 of the second embodiment is also the same as that of the first embodiment, thus the explanation is omitted.

Figure 9:
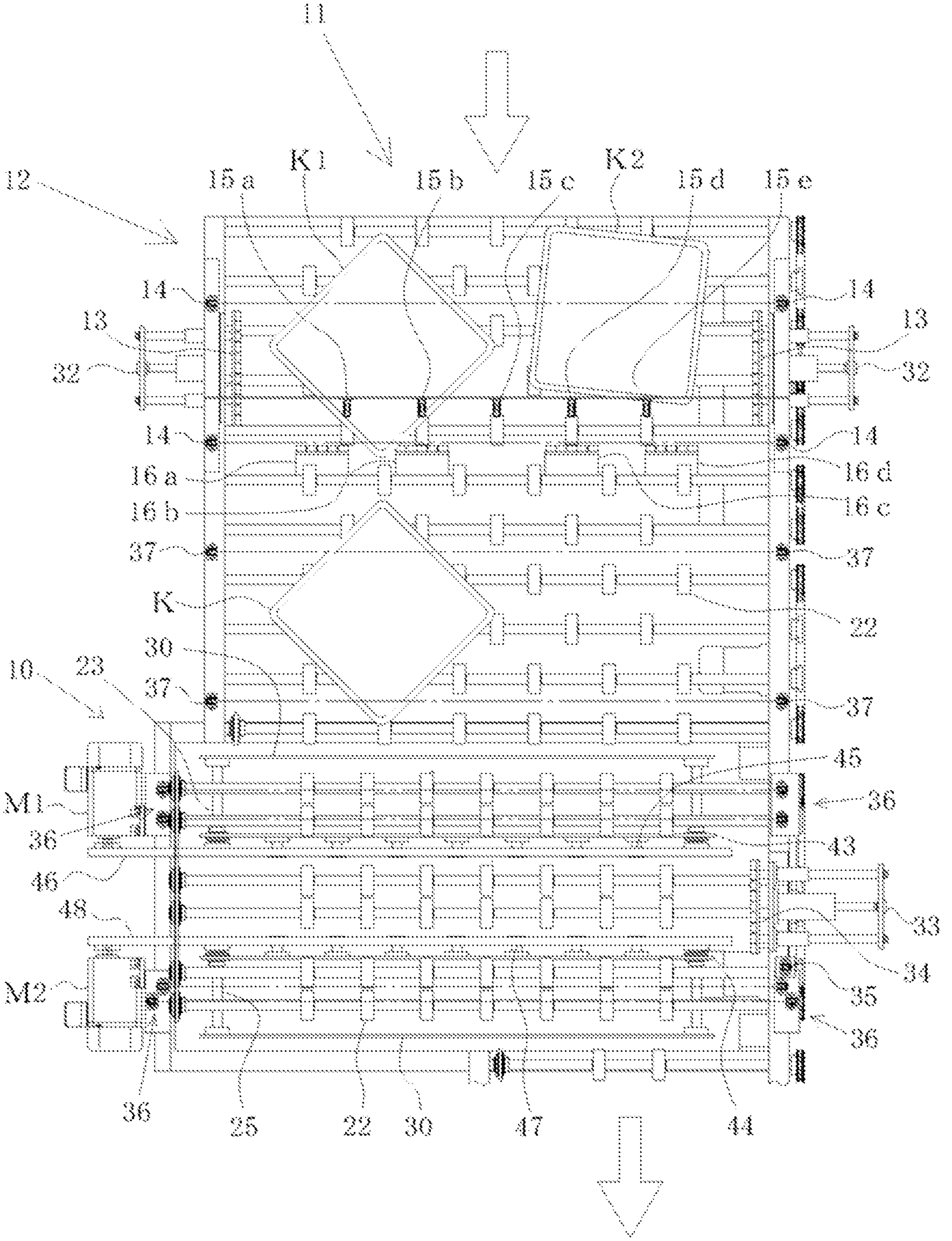
FIG. 9 shows a plan view of a separating device and an orientation adjusting device of the present disclosure (third embodiment).

The third embodiment of the object orientation adjusting device 10 for a roller conveyor of the present disclosure will be described (see FIG. 9). The same reference signs are used to describe the configurations common to the first and second embodiments of the orientation adjusting device 10.

The object orientation adjusting device 10 of the third embodiment comprises: a first belt part 46 comprising a plurality of pulleys 45 configured to rotate in the direction perpendicular to the conveying direction and a flat belt; a second belt part 48 comprising a plurality of pulleys 47 configured to rotate in the direction perpendicular to the conveying direction and a flat belt; a lifting apparatus 21 configured to simultaneously lift the first belt part 46 and the second belt part 48; and the photoelectric sensor group 36 configured to detect the orientation of the saggar K on the plane as its main components. The flat belts of the first belt part 46 and the second belt part 48 may be V-belts, round belts, or any other type.

The orientation adjusting device 10 of the third embodiment is obtained by replacing the first roller group 18 and the second roller group 20 of the orientation adjusting device 10 of the first embodiment with the first belt part 46 and the second belt part 48. The first belt part 46 and the second belt part 48 are provided in parallel, sandwiching two of the plurality of rows of conveyor roller group including the plurality of conveyor rollers 22.

The first belt part 46 comprises the plurality of pulleys 45 supported by the plate 43 connected via the shafts 23 supported by one end of the frame 30 of the lifting apparatus 21, and the flat belt. The plurality of pulleys 45 is connected, via the flat belt, to the motor M1 with a speed reducer disposed on one side of the lifting apparatus 21. Therefore, by driving the motor M1, the number of pulleys 45 can be rotated, allowing the first belt part 46 to rotate in the direction perpendicular to the conveying direction.

The second belt part 48 comprises the plurality of pulleys 47 supported by the plate 44 connected via the shafts 25 supported by the other end of the frame 30 of the lifting apparatus 21, and the flat belt. The plurality of pulleys 47 is connected, via the flat belt, to the motor M2 with a speed reducer disposed on one side of the lifting apparatus 21. Therefore, by driving the motor M2, the plurality of pulleys 47 can be rotated, allowing the second belt part 48 to rotate in the direction perpendicular to the conveying direction.

Driving of the motor M1 and the motor M2 are controlled independently. Thus, the first belt part 46 and the second belt part 48 can rotate forward and reverse, individually or simultaneously, in the direction perpendicular to the conveying direction.

Therefore, by placing the saggar K on the first belt part 46 and the second belt part 48 and driving the motors M1 and M2 to rotate the first belt part 46 and the second belt part 48 in directions opposite to each other, the saggar K can be rotated in one direction on the plane.

The saggar K can also be rotated in one direction on the plane by placing the saggar K on the first belt part 46 and the second belt part 48 and driving the motors M1 and M2 to rotate the first belt part 46 and the second belt part 48 in the same direction at certain different speeds.

The other configurations, such as the lifting apparatus 21 configured to lift the first belt part 46 and the second belt part 48 simultaneously, and the photoelectric sensor group 36 for detecting the orientation of the saggars K on the plane, are the same as in the first embodiment, and the explanations are therefore omitted. The operation of the orientation adjusting device 10 of the third embodiment is also the same as that of the first embodiment, thus the explanation is omitted.

What is claimed is:

1. An object orientation adjusting device for a roller conveyor configured to convey an object, the object orientation adjusting device comprising:

a first roller group comprising a plurality of rollers configured to rotate in a direction perpendicular to a conveying direction;

a second roller group comprising a plurality of rollers configured to rotate in the direction perpendicular to the conveying direction;

a lifting apparatus configured to simultaneously lift the first roller group and the second roller group;

a sensor configured to detect an orientation of the object on a plane; and a plurality of conveyor rollers configured to convey the object in the conveying direction, wherein the first roller group and the second roller group align in the conveying direction and are disposed between the plurality of conveying rollers, when a center of gravity of the object being conveyed in the conveying direction by the plurality of conveyor rollers is positioned between the first roller group and the second roller group in the conveying direction, the lifting apparatus is configured to lift the first roller group and the second roller group to a position higher than a height of the plurality of conveying rollers, the first roller group and the second roller group are configured to rotate in directions opposite to each other or rotate in a same direction at different speeds after being lifted to the position higher than the height of the plurality of conveying rollers, the object orientation adjusting device further comprises a stopper oriented in the direction perpendicular to the conveying direction and disposed on one side of a conveying path, the first roller group and the second roller group are configured to rotate in a same direction as each other to move the object to just upstream of the stopper after the orientation of the object is adjusted, and the stopper is configured to be pushed toward the object and to be pressed against the object after the object moves to just upstream of the stopper.

2. An object orientation adjusting device for a roller conveyor configured to convey an object, the object orientation adjusting device comprising:

a first roller chain part comprising:

a plurality of sprockets configured to rotate in a direction perpendicular to a conveying direction; and a roller chain;

a second roller chain part comprising:

a plurality of sprockets configured to rotate in the direction perpendicular to the conveying direction; and a roller chain;

a lifting apparatus configured to simultaneously lift the first roller chain part and the second roller chain part;

a sensor configured to detect an orientation of the object on a plane; and a plurality of conveyor rollers configured to convey the object in the conveying direction, wherein the first roller chain part and the second roller chain part align in the conveying direction and are disposed between the plurality of conveying rollers, when a center of gravity of the object being conveyed in the conveying direction by the plurality of conveyor rollers is positioned between the first roller chain part and the second roller chain part in the conveying direction, the lifting apparatus is configured to lift the first roller chain part and the second roller chain part to a position higher than a height of the plurality of conveying rollers, the first roller chain part and the second roller chain part are configured to rotate in directions opposite to each other or rotate in a same direction at different speeds after being lifted to the position higher than the height of the plurality of conveying rollers, the object orientation adjusting device further comprises a stopper oriented in the direction perpendicular to the conveying direction and disposed on one side of a conveying path, the first roller chain part and the second roller chain part are configured to rotate in a same direction as each other to move the object to just upstream of the stopper after the orientation of the object is adjusted, and the stopper is configured to be pushed toward the object and to be pressed against the object after the object moves to just upstream of the stopper.

3. An object orientation adjusting device for a roller conveyor configured to convey an object, the object orientation adjusting device comprising:

a first belt part comprising:

a plurality of pulleys configured to rotate in a direction perpendicular to a conveying direction; and a belt;

a second belt part comprising:

a plurality of pulleys configured to rotate in the direction perpendicular to the conveying direction; and a belt;

a lifting apparatus configured to simultaneously lift the first belt part and the second belt part;

a sensor configured to detect an orientation of the object on a plane; and a plurality of conveyor rollers configured to convey the object in the conveying direction, wherein the first belt part and the second belt part align in the conveying direction and are disposed between the plurality of conveying rollers, when a center of gravity of the object being conveyed in the conveying direction by the plurality of conveyor rollers is positioned between the first belt part and the second belt part in the conveying direction, the lifting apparatus is configured to lift the first belt part and the second belt part to a position higher than a height of the plurality of conveying rollers, the first belt part and the second belt part are configured to rotate in directions opposite to each other or rotate in a same direction at different speeds after being lifted to the position higher than the height of the plurality of conveying rollers, the object orientation adjusting device further comprises a stopper oriented in the direction perpendicular to the conveying direction and disposed on one side of a conveying path, the first belt part and the second belt part are configured to rotate in a same direction as each other to move the object to just upstream of the stopper after the orientation of the object is adjusted, and the stopper is configured to be pushed toward the object and to be pressed against the object after the object moves to just upstream of the stopper.

4. The object orientation adjusting device according to claim 1, further comprising a stopper oriented in the direction perpendicular to the conveying direction and disposed on one side of a conveying path.

5. The object orientation adjusting device according to claim 1, further comprising a sensor group configured to detect that the center of gravity of the object is positioned between the first roller group and the second roller group in the conveying direction.

6. The object orientation adjusting device according to claim 1, wherein the first roller group and the second roller group are configured to rotate in directions opposite to each other after being lifted to the position higher than the height of the plurality of conveying rollers.

* * * * *